B. J. MINNIER.
AIR BRAKE APPARATUS.
APPLICATION FILED NOV. 1, 1909.
1,093,454.
Patented Apr. 14, 1914.
5 SHEETS—SHEET 3.
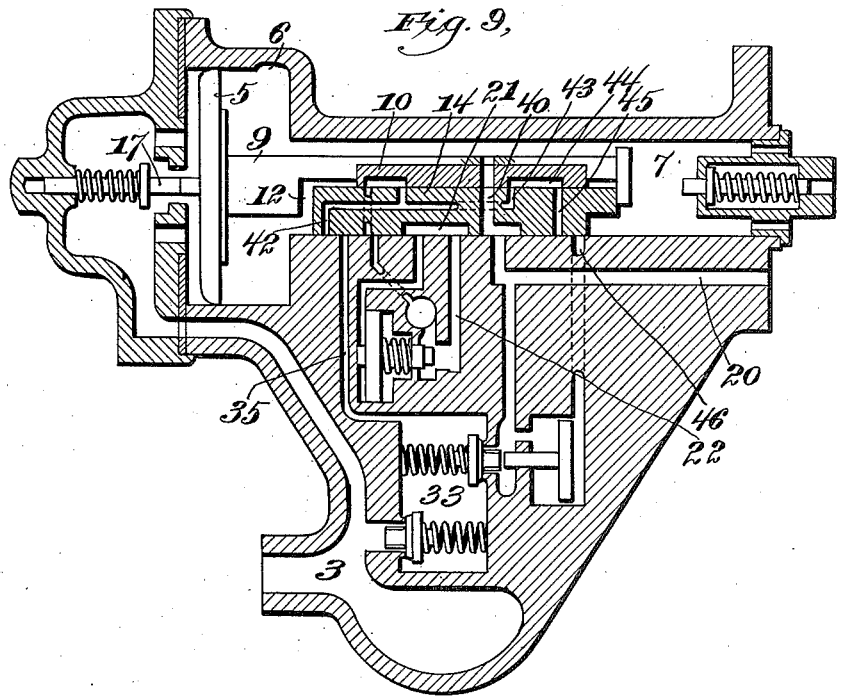
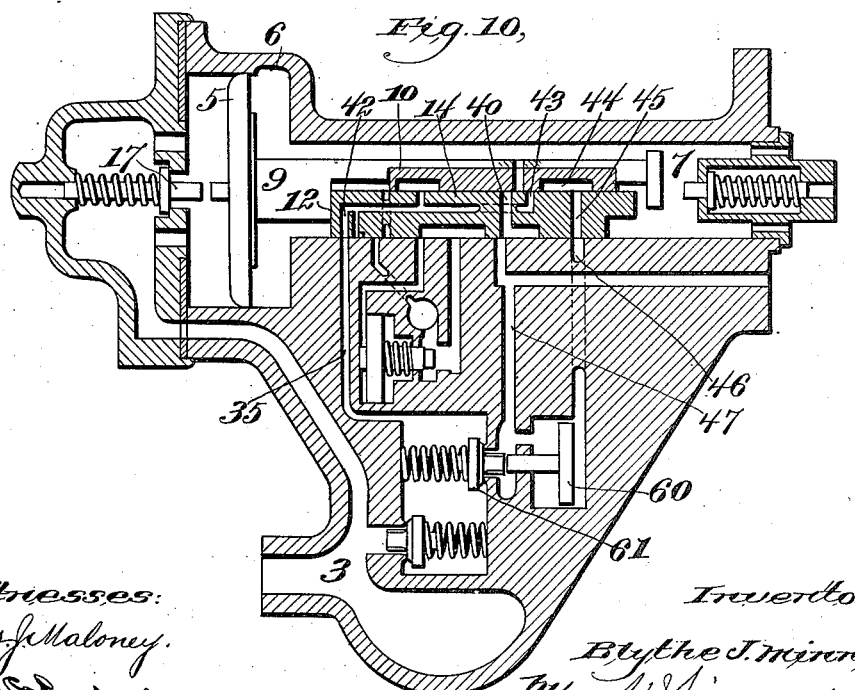

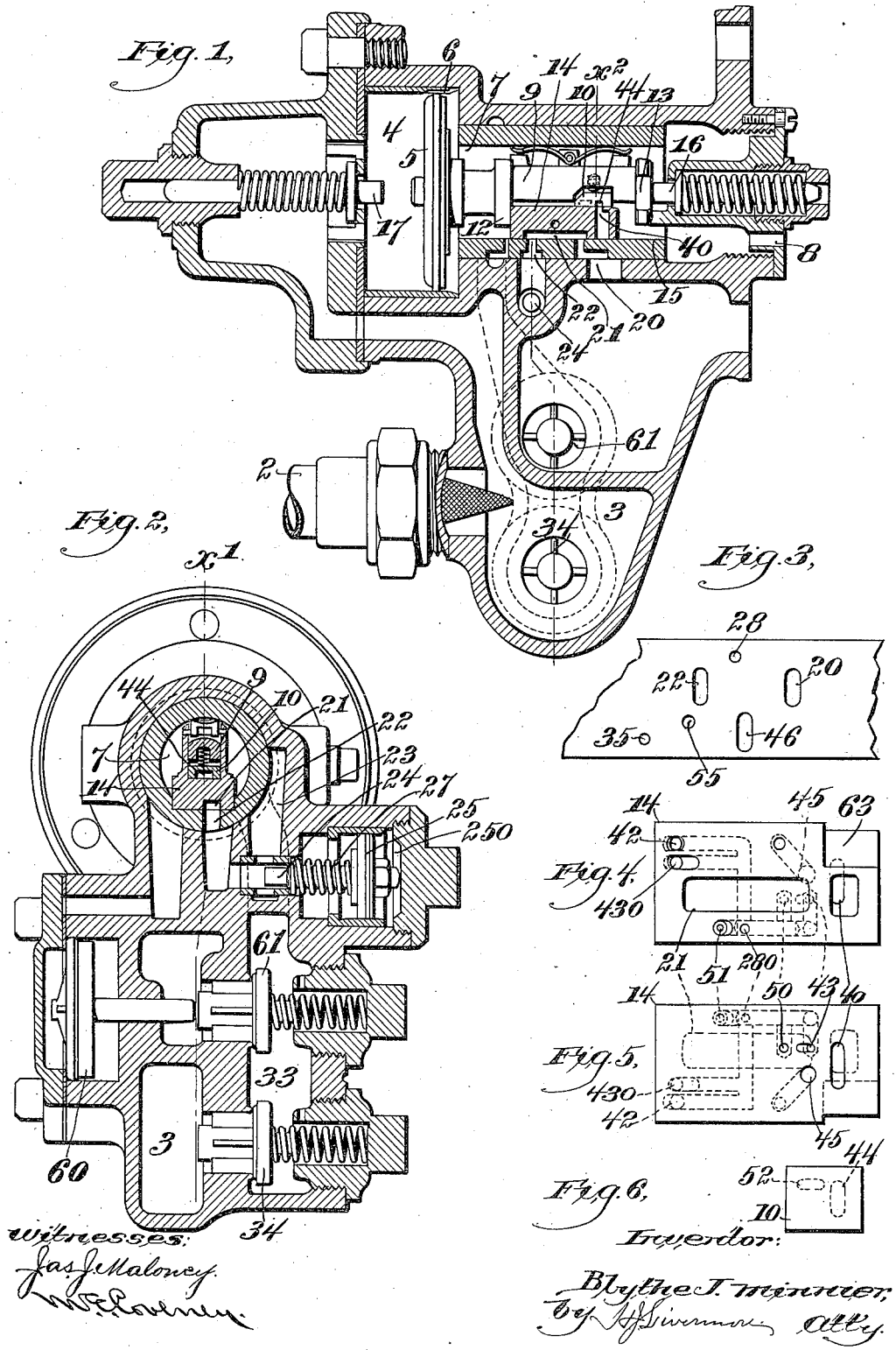

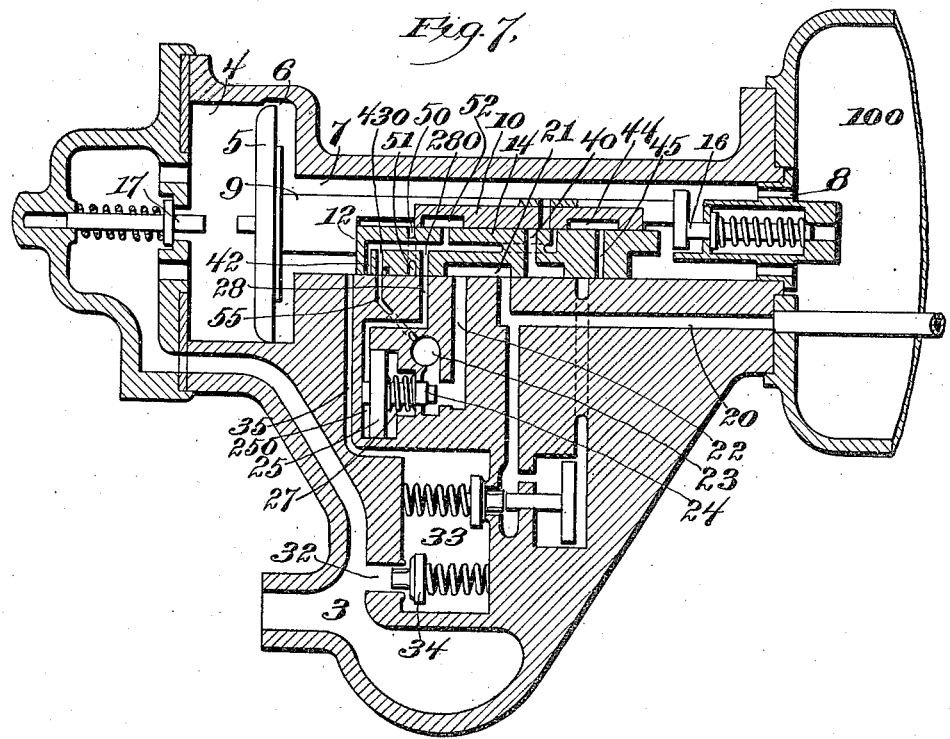
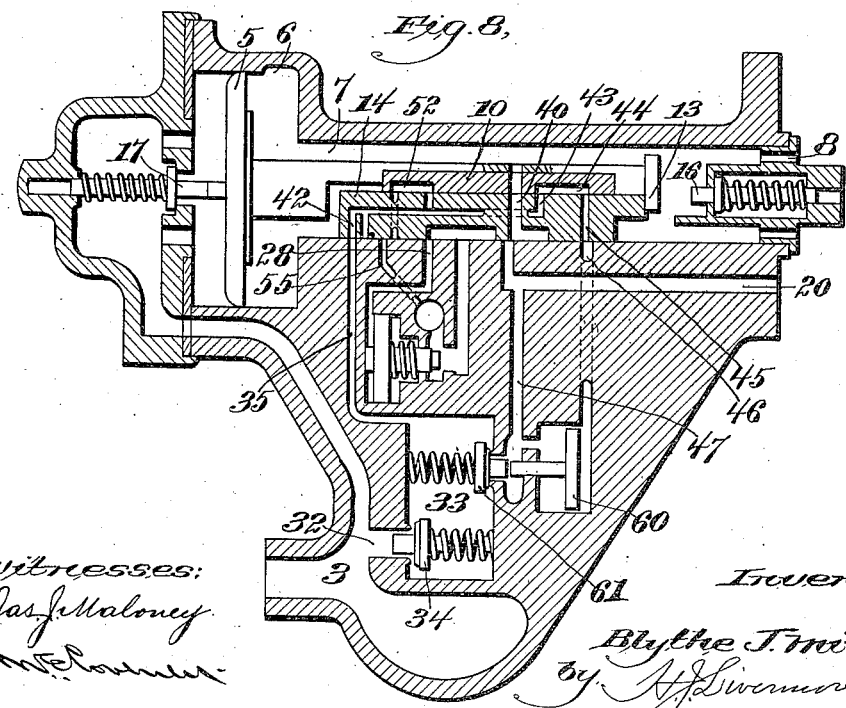

B. J. MINNIER.
AIR BRAKE APPARATUS.
APPLICATION FILED NOV. 1, 1909.

1,093,454.

Patented Apr. 14, 1914.
5 SHEETS—SHEET 4.

UNITED STATES PATENT OFFICE.

BLYTHE J. MINNIER, OF WATERTOWN, NEW YORK, ASSIGNOR TO NEW YORK AIR BRAKE COMPANY, A CORPORATION OF NEW JERSEY.

AIR-BRAKE APPARATUS.

1,093,454.  Specification of Letters Patent.  Patented Apr. 14, 1914.

Application filed November 1, 1909. Serial No. 525,716.

*To all whom it may concern:*

Be it known that I, BLYTHE J. MINNIER, a citizen of the United States, residing in Watertown, in the county of Jefferson and State of New York, have invented an Improvement in Air-Brake Apparatus, of which the following description, in connection with the accompanying drawings, is a specification, like letters on the drawings representing like parts.

The present invention relates to air brake apparatus, and is embodied in a quick action triple valve.

The invention consists in part in the construction of the valve appliances of the triple valve characterized by having provision by which, in the operation of recharging the auxiliary reservoirs in the normal release operation of the brakes, an additional passage besides the usual feed groove around the triple valve piston is provided to admit air from the train pipe to the auxiliary reservoir.

The invention further consists in a construction which, under certain conditions which will be described, causes the exhaust of air from the brake cylinder in the release operation to be retarded as compared with the exhaust in the usual, or what may be regarded as the normal release, and also causes one of the passages by which the auxiliary reservoir is recharged from the train pipe to be closed and the recharging of the auxiliary reservoir thus to be relatively retarded; and the invention further consists in the construction having provision whereby in the service application of the brakes, under certain conditions, air is admitted to the brake cylinder from some other source such, for example, as the train pipe, in addition to that delivered from the auxiliary reservoir, while, under other conditions, air is admitted only from the auxiliary reservoir to the brake cylinder, the operations all being automatic in response to variations in the relative difference between train pipe pressure and auxiliary reservoir pressure in the service and release operations.

The purpose of these features of operation and the conditions which call them into action will be explained in connection with the description of the construction of the appliances by which the operations are automatically produced.

Figure 11:
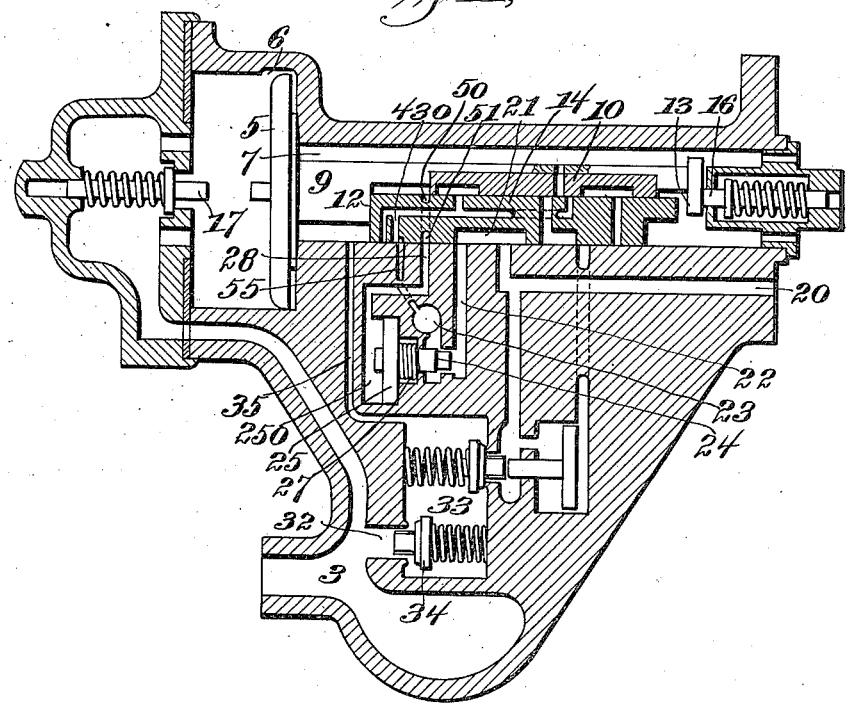
Figure 12:
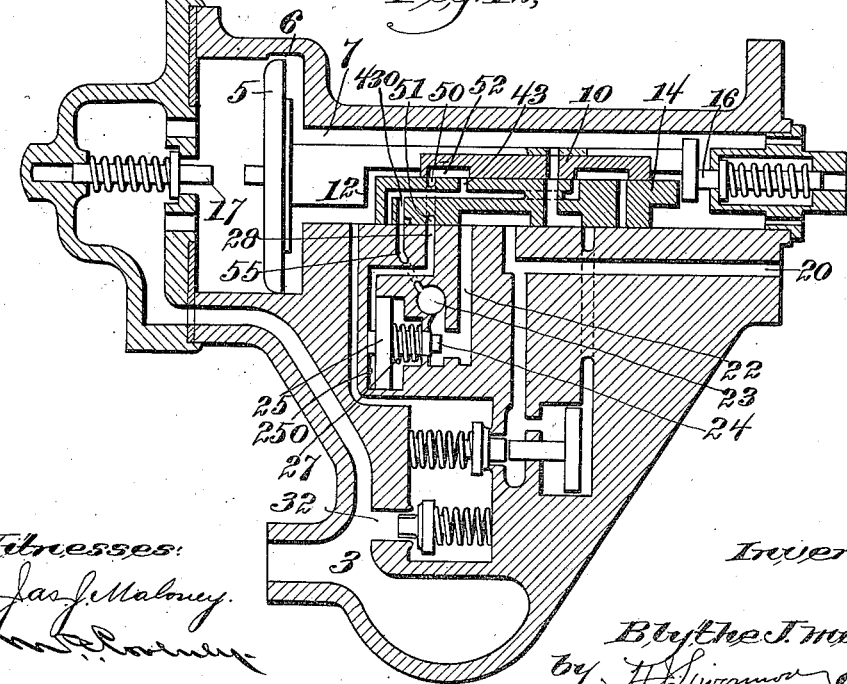

Figure 1 is a longitudinal section, on line $x^1$ of Fig. 2, of a triple valve for an air brake apparatus embodying this invention; Fig. 2 is a transverse section thereof on line $x^2$, Fig. 1; Fig. 3 is a plan view of the valve seat of the main valve proper of the triple valve; Fig. 4 is a plan of the seating face of the main valve proper; Fig. 5 a plan of the top of the main valve proper or seat for the supplementary or graduating valve; Fig. 6 is a plan of the said supplementary valve; and Figs. 7 to 13, inclusive, are diagrammatic sections with the passages in and controlled by the valves mainly in one plane to illustrate their working relations to one another in the various operations of the valve; Fig. 7 showing the position in what may be called the normal release operation; Fig. 8 showing the parts in what may be called "quick service" position; Fig. 9 the full service position; Fig. 10 the service lap position; Fig. 11 restricted release position; Fig. 12 normal release position following restricted release operation; and Fig. 13 the emergency position.

Referring to Figs. 1 and 2, the main structural and working components of the triple valve are or may be similar to those of the triple valves now in common use, and, broadly considered, perform the usual functions of releasing the brakes when train pipe pressure is increased, and recharging the auxiliary reservoirs from the train pipe in the release operation, and causing the brakes to be applied when train pipe pressure is reduced relative to auxiliary reservoir pressure by flow of air from the auxiliary reservoir into the brake cylinder to apply the brakes with a force dependent on the amount of reduction in train pipe pressure.

Air is admitted from the train pipe 2 (see Fig. 1) into chamber 3 in the main valve shell, and thence passes to the cylinder 4 in which the triple valve piston 5 operates, there being a feed groove 6 through which air may pass from the train pipe past the piston 5 into the valve chamber 7 which communicates at 8 with the auxiliary reservoir 100 (Fig. 7) thus providing for the usual feed of air from the train pipe to the auxiliary reservoir in the release operation under conditions that will be stated later.

The stem 9 of the triple valve piston engages the supplementary valve 10 and moves the same proportionately to the movement of the triple valve piston, and said stem 9 is also provided with projections 12, 13 which engage the main valve 14 and cause the same to accompany the triple valve piston in its movement, but are so located as to afford a predetermined amount of independent movement in which the supplemental valve 10 is shifted on the main valve 14 without shifting movement of said main valve upon its seat 15. As thus far specified the structural relations are the same as in triple valves now in common use.

Using, for convenience, the terms "right" and "left" and "top" and "bottom", with reference to the parts as represented in the several figures of the drawing, the train pipe pressure acts on the left hand side of the triple valve piston 5, and the pressure of the air in the auxiliary reservoir acts upon the right-hand side of said piston, and when train pipe pressure preponderates the piston will be moved toward the right, and when auxiliary reservoir pressure preponderates the piston will be moved toward the left. A yielding stop 16 is provided, which is a release governing stop and is shown as a spring-pressed pin or rod, which is encountered by the stem of the triple valve piston in its movement toward the right when it arrives at the position shown in Fig. 1, and in the diagram, Fig. 7, which stop prevents further movement of the piston toward the right when train pipe pressure preponderates less than a predetermined amount above auxiliary reservoir, under which condition the normal release is effected, but said stop yields in case train pipe pressure preponderates over auxiilary reservoir pressure more than a predetermined amount, and under such condition permits the piston 5 to be forced farther toward the right, bringing the parts to the operative relation illustrated in Fig. 11, in which the restricted or slow release of the brakes is effected.

A yielding stop 17, called, for convenience, the emergency stop, also coöperates in the movement of the triple valve piston toward the left, arresting the said piston when auxiliary reservoir pressure preponderates less than a predetermined amount above train pipe pressure, but yielding to permit the triple valve piston to make a further traverse toward the left when auxiliary reservoir pressure preponderates more than a predetermined amount above train pipe pressure to produce an emergency application of the brakes as in the triple valves now in common use, but in the valve forming the subject of the present invention, said stop 17 has what may be called a partial yielding movement under certain conditions to be hereinafter set forth, which causes new functions to be performed as will be hereinafter explained. When auxiliary reservoir pressure preponderates over train pipe pressure an amount insufficient to move the stop 17, the parts are in the working relation illustrated in Fig. 8, and when auxiliary reservoir pressure preponderates greatly so as fully to overcome the yielding resistance of said stop and produce an emergency application of the brakes, the parts are in the working relation shown in Fig. 13, and if the preponderance of auxiliary reservoir pressure is such as to produce the partial yielding of said stop above referred to, the parts are in the working relation illustrated in Fig. 9.

The remaining structural features that constitute the distinguishing characteristics of the valve forming the subject of this invention consist, for the most part, in the construction and arrangement of the various passages in and controlled by the valves, thus far considered, and accessory appliances for performing the various desired functions according to the various positions assumed by the triple valve piston in response to the pressure conditions to which it is submitted, and will be best understood by describing in connection with the diagrams, the working relations in the several positions of the triple valve piston, and the conditions which cause the triple valve piston to assume such positions.

To facilitate the understanding of the diagrams, which illustrate the several communications established under the different conditions, but do not show the actual construction and location of the ports, the actual relations of the port openings in the several positions will first be stated, reference being made to the views of the seating faces, Figs. 3 to 6, inclusive.

The supplemental valve 10 has two positions relative to the main valve 14, viz., the position toward the right, when the main valve is engaged by the stop 12 on the piston stem 9, and the position toward the left in which the main valve is engaged by the stop 13 on said stem of the actuating piston. In the position toward the right, the supplemental valve covers the port 40 through the main valve, and uncovers the port 50 in the main valve, and in its position at the left hand relative to the main valve it uncovers or opens the port 40, and by its cavity 44 connects the port openings 43, 45 in the top of the valve. In the movement from the right hand to the left hand position the cavity 52 connects the openings of port 50 and 43.

The main valve has several different positions on the main valve seat, viz., the position to the extreme right (retarded release illustrated in Fig. 11) when it is against the shoulder 12 of the stem of actuating piston, and the latter is in extreme right hand position, having overcome the yielding stop 16. In this position, the cavity 21 of the main valve connects the brake cylinder and exhaust passages 20—22 in the valve seat, and port 50 (which is uncovered by supplementary valve) has its opening 51 in communication with opening 28 in valve seat, and the opening of port 35 in the valve seat is uncovered.

In the normal release position in which the main valve is stopped against the shoulder 12 on the valve stem, and the latter is arrested by the yielding stop 16 (the position shown in Figs. 1 and 7) the port relations are the same as have just been described, except that the port 280, instead of the port 51, is in communication with the port 28 in the valve seat.

In quick service position (Fig. 8), the main valve has been moved toward the left by the shoulder 13 to the point where the piston 5 is arrested by the emergency stop 17. In this position, the port opening 40 is in partial registration with the opening 20 in the valve seat, and the passage 45 is in communication with the port 46, and the passage 42 in communication with the port 35.

In the full service position (Fig. 9) in which the piston has traveled a little farther to the left partially overcoming the force of the spring of the emergency stop, the communications are the same except that port 40 fully registers with the port 20, and port 42 is out of registration with the port 35.

In the emergency position (Fig. 13), the main valve has been carried to the left by the full traverse of the piston, overcoming spring of the emergency stop, and in this position the port 46 in the valve seat is uncovered by reason of the cavity 63 in the main valve, and port 20 is partially uncovered by the main valve.

The openings 42, 430, and 280 in the lower face, and the opening 43 in the upper face all enter a single passage in the body of the main valve, and the opening 51, in the lower face communicates with opening 50 in the upper face by another passage in the valve body having no connection with the first mentioned passage that connects 42, 430, 280 and 43.

In the following description of the diagrams representing the positions under the several conditions of use, the description will be confined mainly to the ports which are in communication in each position, it being understood, if not so stated, that the other ports are blanked, or have no working communication therethrough and it also being understood that the diagrams do not represent the actual construction and location of the various ports, but are merely illustrative and represent the communications which are established under the various conditions of service, by which communications the operative effects are secured.

Fig. 7 illustrates the working relations of the various passages when the parts are in the position shown in Fig. 1 of the drawing, which will be called the normal release position, as it corresponds most nearly to the operation of releasing the brakes with triple valves heretofore commonly used. The condition under which this normal release operation takes place is that the train pipe pressure preponderates moderately over auxiliary reservoir pressure (not sufficiently to overcome the resistance of the yielding stop 16) as when air is admitted relatively slowly in the train pipe in a short train, or, as is the condition toward the rear end of a long train, even if air is admitted rapidly to the train pipe at the forward end of the train.

As shown in Figs. 1 and 7, the main valve 14 is in the position which results from the traverse of the piston 5 toward the right, to the point at which it is arrested by the resistance of the yielding stop 16, the supplementary valve 10 being in its right hand position on the main valve 14, and the latter being against the shoulder 12 on the piston rod 9, as occurs when the preponderance of train pipe pressure over auxiliary reservoir pressure is insufficient to overcome the resistance of said stop 16.

With the parts in the normal release position illustrated in Fig. 7, the air is exhausted from the brake cylinder through the brake cylinder passage 20, the exhaust cavity 21 in the main valve 14 and the exhaust passage 22, 23 leading from the valve seat to the atmosphere, the portions 22, 23 of said passage communicating through an opening controlled by a retarding device 24 operated by a piston 25, the purpose of which will be explained later.

In the normal release operation, the retarding device 24 is functionless, or inactive, as it is retained in the non-working position shown, by the spring 27 which tends to force the piston 25 toward the left, in Fig. 7, (toward the right in Fig. 2) and the space 250 at the left of said piston is connected by a passage 28 opening in the main valve seat, with passage 280 in the main valve, which latter opens into the passage having an opening 430 in communication with port 55 in the valve seat leading to the portion 23 of the exhaust passage that leads directly to the atmosphere, and thus places the space at the left hand of piston 25 in communication with the atmosphere. In this normal release position the auxiliary reservoir 100 (indicated at the right hand in Fig. 7) is charged from the train pipe through the feed groove 6 past the triple valve piston 5 in the usual manner, but an additional passage for charging is also afforded as follows: The chamber 3 which is in communication with the train pipe, also communicates by passage 32 with a chamber 33 through a valve seat controlled by a check valve 34 opening toward the chamber 33, which latter also has a passage 35 leading to the main valve seat which, when the main valve is in the normal release position shown, is open, and thus permits air to pass from the train pipe through passage 32 past check valve 34 into chamber 33, and by passage 35 into the main valve chamber 7, and thence to the auxiliary reservoir, which is thus charged more rapidly than it would be by the feed groove 6 acting alone. The feed groove 6 may, therefore, be of less than the usual capacity if it is desired to have the auxiliary reservoir charged at approximately the usual rate, such recharging being effected by the combined capacity of the passages 6, 35, as promptly as would be effected by a feed groove 6 of considerably larger capacity operating alone. It may be noted at this point, however, that the passage 35 is of quite small capacity, in view of another function which will be explained later.

Referring to Fig. 11, the relation of the parts in what is herein called restricted release of the brakes is represented. The condition for effecting this operation is that train pipe pressure preponderates over auxiliary reservoir pressure sufficiently to retain the yielding stop 16 overcome, the triple valve piston 5 remaining held by preponderance of train pipe pressure at the extreme right end of its traverse, in which position it seats against the entrance of the valve chamber 7 and thus prevents feed of air from the train pipe to the auxiliary reservoir through the feed groove 6. The feed for charging the auxiliary reservoir, therefore, at this time takes place only through passage 32 past the check valve 34 into the chamber 33, and through passage 35 into valve chamber 7, and thence to the auxiliary reservoir the same is in the normal release represented in Fig. 7. In this restricted release position of Fig. 11, the main valve 14 is in a position farther to the right than in the normal release represented in Fig. 7, but still connects the brake cylinder passage 20 by the cavity 21 with the portion 22 of the exhaust passage, the same as before described, but the passages 280, 430, 55 no longer connect the chamber 250 at the left of the piston 25 with the atmosphere, as in the normal release position before explained. The port opening 51 in the main valve now registers with the valve seat opening of port 28 leading to chamber 250 at the left of the retarding piston 25, and the opening 50 of said port in the main valve is uncovered by the supplementary valve and thus open to communication with the valve chamber 7 so that pressure is admitted to the chamber 250 at the left of piston 25, which overcomes the force of the spring 27 and moves the retarding device 24 to the point where it enters the opening between the portions 22, 23 of the exhaust passage and prevents free communication between them. Said retarding device 24, however, is of such size or construction as to afford a restricted communication between the portions 22, 23 of the exhaust passage, and thus provides for a relatively slow escape of air from the brake cylinder and consequent retardation in the release of pressure on the brakes. This condition of restricted exhaust and slow release remains until the preponderance of train pipe pressure sufficient to overcome the yielding stop 16 ceases to exist, which condition will take place automatically by the charging of the auxiliary reservoir, and when the auxiliary reservoir pressure approaches train pipe pressure sufficiently, the reaction of the stop 16 will move the triple valve piston and supplementary valve 10 to the position shown in Fig. 12 (normal release following restricted release) in which the parts are in the same relation as in the normal release position shown in Fig. 7, except that the main valve is farther to the right than in Fig. 7, and not against the shoulder 12 of the piston stem.

The reaction of the stop 16 after the parts have been in restricted release position, shifts the supplemental valve on the main valve without changing the position of the latter upon the main valve seat. This shifting of the supplemental valve operates to cut off communication of the passage 50 in the main valve with the valve chamber 7 and auxiliary reservoir, but connects said passage 50 (which is still in communication at 51 with passage 28, as shown in Fig. 11) by the cavity 52 in the supplemental valve with the opening 43 of the passage in the main valve, the opening 430 of which is at this time in communication with the passage 55 in the main valve seat communicating with the passage 23 leading directly to the atmosphere. Thus, by the shifting of the supplemental valve on the main valve, the pressure is cut off from the left hand side of the piston 25, and communication is established between the chamber 250 at the left of said piston and the atmosphere, so that the spring 27 operates to force the piston 25 toward the left, and thus to remove the retarding device 24 from the exhaust passage from the brake cylinder, which, for the remainder of the operation, will exhaust freely, the same as in the normal release operation before considered, the relation being as shown in Fig. 12.

The supplementary valve 10, besides performing the usual functions of a graduating valve in making service applications of the brakes, as will be more fully described later on, thus also constitutes a brake cylinder exhaust controlling valve by which the brake cylinder exhaust, and the release of the brakes, may be made promptly when the exhaust passage is not restricted, as shown in Fig. 7, or may be made slowly, as shown in Fig. 11, when the exhaust is restricted by the retarding device 24 operated by the piston 25 under control of the supplementary exhaust controlling valve 10, itself governed in accordance with the amount of preponderance of train pipe pressure over auxiliary reservoir pressure in the release operation.

On trains of moderate length, the preponderance of train pipe pressure to cause the normal release or the restricted release to take place, as desired, may be governed by the engineer by the usual appliances for admitting air to the train pipe and permitting it to escape therefrom, but on long trains the operation may in part be effected automatically, for if air is admitted to the train pipe quite rapidly the train pipe pressure will increase at the forward part of the train more rapidly than toward the rear part, and, consequently, in the equipments in the forward part of the train the preponderance of train pipe pressure will be sufficient to place the parts in the restricted release position represented in Fig. 11, while in the equipments in the rear part of the train the parts will be placed in the normal release position shown in Fig. 7, the result being that the brakes are released more promptly in the rear part of the train than in the fore part, which is desirable because the maintenance of some of the braking effect in the fore part of the train until the brakes at the rear part are fully released causes the cars to bunch together on the couplings as is desirable in the subsequent handling of the train.

The service applications of the brakes are effected in the usual manner by reducing train pipe pressure, but the construction forming the subject of this invention provides for different actions in applying the brakes dependent upon different conditions, which conditions depend in some respects upon the length of the train and thus produce the corresponding effects automatically.

With a moderate reduction of train pipe pressure taking place relatively slowly, the preponderance of auxiliary reservoir pressure will move the triple valve piston toward the left until it brings up on the yielding emergency stop 17 with the parts in the position shown in Fig. 8, the said stop 17 preventing further movement unless the preponderance of auxiliary reservoir pressure is increased by a rapid reduction of train pipe pressure. The check-valve 34 prevents flow of air from passage 35 to the train pipe when the pressure in the train pipe is reduced to cause the movement of the piston 5.

With the parts in the position shown in Fig. 8 (herein called the quick service position) the supplementary valve 10 has uncovered the brake cylinder supply port 40 in the main valve, and said port 40 has also been brought into partial register with the brake cylinder port 20 in the main valve seat, and thus permits air to flow from the auxiliary reservoir and valve chamber 7 into the brake cylinder, but with less than the maximum provision for flow of air from the auxiliary reservoir to the brake cylinder, because the supply port 40 does not fully register with the opening of the brake cylinder port 20 in the valve seat. In this position of the main and supplementary valves, however, the passage 42 in the main valve registers with the passage 35, before described, which communicates with the chamber 33 and through check valve 34 and passage 32 with the train pipe passage 3, said passage 42 having an opening 43 through the top of the main valve in the seat for the supplementary valve 10 thereon, which opening is in communication with the cavity 44 in the supplementary valve which also communicates with the passage 45 in the main valve, which is in communication with the opening of a passage 46 leading to the chamber of the piston 60 that operates valve 61 in the emergency operation, as will be described later on.

The piston 60 is loose fitting, or provided with a small passage through it, so that air may pass from passage 46 past the piston 60 into passage 47 which communicates with the brake cylinder passage 20, so that air is permitted to flow from the train pipe past the check valve 34 through passage 35, and by the passages just described past the emergency piston 60 into the brake cylinder to provide braking pressure therein additional to that supplied from the auxiliary reservoir through the passage 40.

The passage 35, or some part of the communication from the train pipe to the brake cylinder, as has been stated, is made relatively small in order that in this operation train pipe pressure may not be caused to fall more rapidly than auxiliary reservoir pressure by the flow of air into the brake cylinder, as this would increase the preponderance of auxiliary reservoir pressure and might result in a movement of the triple valve piston and parts actuated by it to the emergency position.

On long trains, the pressure falls relatively slowly in the train pipe in response to the service opening made by the engineer to permit air to escape from the train pipe, and the passage of air from the train pipe to the brake cylinder through passage 35, as has been explained, in the cars near the head of the train which respond first to the reduction in train pipe pressure made by the engineer, will accelerate the reduction in train pipe pressure, and will, therefore, cause the equipments toward the rear in the train to act more promptly than would be the case if the train pipe were vented only through the passage controlled by the engineer.

If train pipe pressure falls more rapidly, as would be the case on a relatively short train, even with the same vent opening for escape of air as made on a long train, the preponderance of auxiliary reservoir pressure may be sufficient to overcome the resistance of the stop 17, but unless the preponderance is very rapidly increased it will produce only a partial yielding of the said stop 17, bringing the parts to the position shown in Fig. 9, which may be, for convenience, called the full service position, as it would result from the full and continued opening of the train pipe vent, such as made when it is desired to apply the brakes with full force, but not suddenly, as in an emergency application.

The partial yielding of the stop 17 brings the parts to the position shown in Fig. 9 which differs from that shown in Fig. 8 first, in that the supply port 40 in the main valve is in full registration with the brake cylinder port 20, thus affording maximum service delivery of air from the auxiliary reservoir to the brake cylinder, and the communication from the train pipe through passage 35 and passages 42, 43, 44, 45, 46 is cut off at 42—35, so that air is not delivered from the train pipe into the brake cylinder and the reduction in train pipe pressure is consequently no more rapid than what can be effected through the vent controlled by the engineer, thus automatically preventing the increase in preponderance of auxiliary reservoir pressure which might otherwise result in moving the parts to emergency position.

It may be noted that the movement of the main valve from the release position shown in Figs. 1, 7 and 11 cuts off the communication by cavity 21 from the brake cylinder passage 20 to the exhaust passage 22, substantially as usual in triple valve devices of this general character.

In making service applications the braking force may be graduated as usual, it depending upon the amount of reduction of train pipe pressure, and for a partial application of the brakes, a comparatively small reduction of train pipe pressure is made by the engineer who then closes the vent to prevent further escape of train pipe air, after which the parts remain in the position shown in Fig. 9, or in Fig. 8, until the reduction of auxiliary reservoir pressure by flow of air through passage 40 into the brake cylinder reduces the auxiliary reservoir pressure slightly below train pipe pressure, the preponderance of which will then move the triple valve piston toward the right from the position shown in Figs. 8 and 9 to that shown in Fig. 10, in which latter position the engagement of the stop shoulder 12 with the main valve will arrest the movement as there is no further increase in preponderance of train pipe pressure. The parts will then remain in the position shown in Fig. 10 until some further change is made in train pipe pressure, and the movement of the supplemental valve 10 on the main valve from the position shown in Fig. 8 or 9 to that shown in Fig. 10 closes the supply port 40, thus preventing any delivery of air from the auxiliary reservoir into the brake cylinder, and consequently any further diminution of auxiliary reservoir pressure and consequent increase of preponderance of train pipe pressure, and at the same time the supplementary valve will shut off at 43—44—45 the communication through the passages 35, 42, 43, 44, 45, 46, 47, by which air was delivered from the train pipe into the brake cylinder past the emergency piston 60 in the quick service position shown in Fig. 8. The parts will, therefore, remain in the position shown in Fig. 10 with the brakes applied an amount dependent upon the reduction of train pipe pressure that had been made, until some change in braking force is required, which may be effected by the engineer letting more air escape to increase the braking force, the reduction in train pipe pressure causing the triple valve piston and supplementary valve to move to the position shown in Fig. 8 (or Fig. 9) until auxiliary reservoir pressure again equalizes with or falls slightly below train pipe pressure, and so on until the brake cylinder pressure equalizes with the auxiliary reservoir pressure, when the maximum braking force for service application has been attained.

To release the brakes, air is admitted to the train pipe and moves the parts to the normal release or restricted release positions, before explained, according as the increase in train pipe pressure above auxiliary reservoir pressure is more or less.

Figure 13:
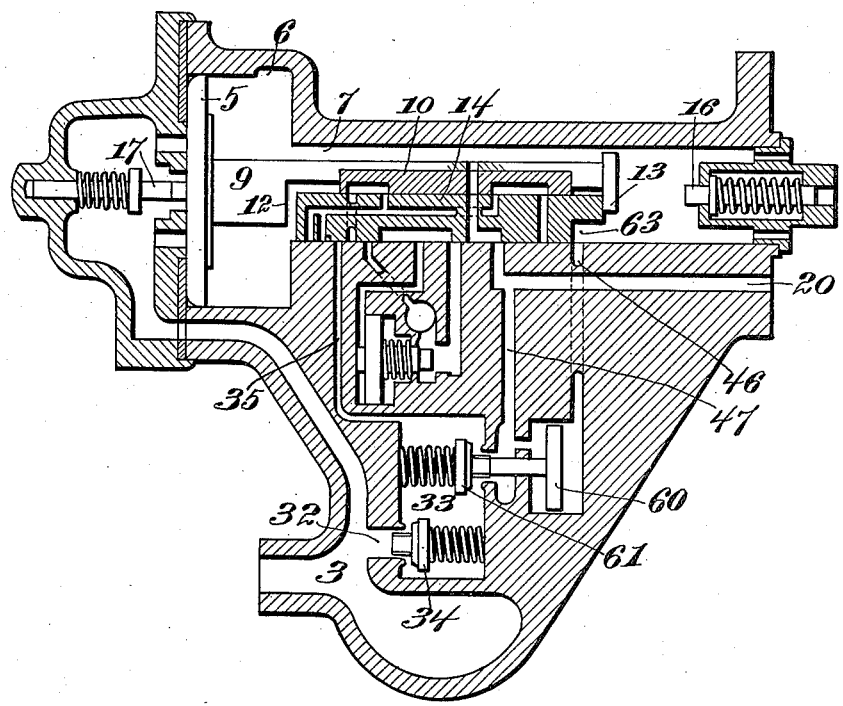

An emergency application is produced in the usual manner by opening a large vent from the train pipe (or by the parting of a coupling, for example) and the large preponderance of auxiliary reservoir pressure thus produced causes the triple valve piston to make its complete traverse toward the left, fully overcoming the resistance of the stop 17 and bringing the parts to the operative relation illustrated in Fig. 13. In this position, the passage 35 is closed, and the brake cylinder passage 20 is uncovered by the main valve, permitting delivery of air from the auxiliary reservoir into the brake cylinder, and the passage 46 from the valve chamber 7 to the emergency piston 60 is uncovered by reason of the recess 63 in the main valve, thus permitting pressure from the valve chamber to act upon the right hand side of the piston 60 in such volume as to force the said piston to the left and cause it to open the valve 61 which controls communication from the chamber 33 to the passage 47 leading to the brake cylinder passage 20, so that train pipe air in passages 3, 32 (which is in excess of brake cylinder pressure, although train pipe pressure is rapidly falling) open the check valve 34 and passes into chamber 33 and thence past valve 61 into passage 47, and by passage 20 into the brake cylinder, effecting a further reduction in train pipe pressure and an increase in brake cylinder pressure above the maximum obtainable from the auxiliary reservoir as is usual in so-called quick action triple valves.

The operation under the various conditions may be summarized as follows: The normal release of the brakes and recharging of the auxiliary reservoirs is effected when train pipe pressure preponderates over auxiliary reservoir pressure less than a predetermined amount. The triple valve piston is then held by train pipe pressure against the yielding stop 16, the resistance of which is sufficient to overcome the preponderance of train pipe pressure. Air is exhausted from the brake cylinder through the relatively large unrestricted passage, and air feeds from the train pipe into the auxiliary reservoir through the feed groove past the triple valve piston and also through a passage in the main valve seat. The retarded release of the brakes is effected when train pipe pressure preponderates over auxiliary reservoir pressure more than the predetermined amount in which it effects the normal release. The triple valve piston is held at the extreme end of its traverse by the preponderance of train pipe pressure which is enough to overcome the resistance of the yielding stop 16. Pressure is admitted through a passage controlled by supplementary and exhaust controlling valve to put the exhaust restricting device in working position and air is exhausted slowly from the brake cylinder through the restricted discharge passage, causing the reduction of braking pressure or release of the brakes to take place slowly. Feed of air through the feed groove past the triple valve piston is prevented, and air is fed from the train pipe to the auxiliary reservoir for recharging the same through passage in the main valve seat. When auxiliary reservoir pressure becomes nearly equal to train pipe pressure, the reaction of the yielding stop moves the parts to a condition practically the same as in the normal release position and the further charging of the auxiliary reservoir and exhaust from the brake cylinder, if there be any, is the same as in the normal release operation.

In a service application of the brakes, train pipe pressure is reduced and the triple valve piston and parts operated thereby are moved until engaged by the yielding emergency stop. If train pipe pressure is reduced only slightly below auxiliary reservoir pressure, the emergency stop arrests the triple valve piston without yielding, and air flows from the auxiliary reservoir into the brake cylinder through a partially open or restricted port opening, and air also flows from the train pipe to the brake cylinder through passages controlled by the main and supplemental valves, the passages from the auxiliary reservoir and from the train pipe to the brake cylinder being so proportioned that auxiliary reservoir pressure is reduced more rapidly than train pipe pressure by the flow of air therethrough.

If train pipe pressure is reduced a somewhat greater amount below auxiliary reservoir pressure, the yielding resistance of the emergency stop is overcome, and a further movement of the triple valve piston (less than to the end of the full traverse, however) takes place, by which movement the capacity of the passage from the auxiliary reservoir to the brake cylinder is increased and the passage from the train pipe to the brake cylinder is closed.

When, in the application of the brakes, auxiliary reservoir pressure equalizes with or falls slightly below train pipe pressure, the triple valve piston moves to shift the supplementary valve on the main valve without shifting the latter on its seat, and said movement of the supplementary valve closes the passage from the auxiliary reservoir to the brake cylinder and also the passage from the train pipe to the brake cylinder, if open. A braking pressure is thus produced in the brake cylinder depending in amount upon the amount of train pipe pressure reduction, and if it is less than the pressure remaining in the auxiliary reservoir, it may be increased by further diminishing train pipe pressure, which will cause the supplemental valve to be shifted on the main valve to permit air to flow to the brake cylinder, and will be shifted back to stop the flow of air when auxiliary reservoir pressure again falls slightly below the train pipe pressure.

For an emergency application, air is vented fully and promptly from the train pipe, and the auxiliary reservoir pressure causes the triple valve piston to make its full stroke fully overcoming the emergency stop, and air is then admitted from the auxiliary reservoir to the brake cylinder, and also to open the valve which admits air direct from the train pipe to the brake cylinder.

What I claim is:

1. In a triple valve for automatic air brake apparatus, the combination with the triple valve piston and main valve, and supplementary valve movable relative to the main valve, of a yielding stop which overcomes a predetermined preponderance of train pipe pressure on the triple valve piston but is overcome by a larger preponderance; and a restricting device coöperating with the brake cylinder exhaust passage and controlled by the supplemental valve according as the preponderance of train pipe pressure is sufficient to overcome the resistance of the yielding stop or not.

2. In a triple valve for automatic air brake apparatus, the combination of the triple valve piston and main and supplementary valves operated thereby, with a restricting device coöperating with the brake cylinder exhaust passage and an operating piston therefor, the fluid pressure for operating said piston being governed by ports in said main and supplementary valves.

3. The combination of the triple valve cylinder, and piston, and main and supplementary valves operated thereby; of a yielding stop which overcomes a predetermined preponderance of train pipe pressure on the triple valve piston, but is overcome by a larger preponderance; a restricting device coöperating with the brake cylinder exhaust passage, and an operating piston therefor; fluid pressure to actuate said piston to bring said restricting device into operation, being admitted by said supplementary valve when train pipe pressure is sufficient to overcome said stop; and an exhaust passage being provided which permits said restricting device to be inactive when the triple valve piston is arrested by said stop.

In testimony whereof, I have signed my name to this specification in the presence of two subscribing witnesses.

BLYTHE J. MINNIER.

Witnesses:
C. J. COTTEE,
GEO. O. HAMMOND.

---

Copies of this patent may be obtained for five cents each, by addressing the "Commissioner of Patents, Washington, D. C."